United States Patent Office 3,824,262
Patented July 16, 1974

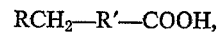

3,824,262
PROCESS FOR PREPARING ETHYLENIC CARBOXYLIC ACIDS
Lammert Heslinga, Maassluis, and Hendrix Jacob Johannes Pabon and David Adrian van Dorp, Vlaardingen, Netherlands, assignors to Lever Brothers Company, New York, N.Y.
No Drawing. Filed Mar. 20, 1972, Ser. No. 236,234
Claims priority, application Great Britain, Mar. 25, 1971, 7,775/71
Int. Cl. C08h 17/36
U.S. Cl. 260—409          9 Claims

---

ABSTRACT OF THE DISCLOSURE

Ethylenic acids of the structure $RCH_2-R^1-COOH$, where R is an aliphatic hydrocarbon radical containing from 1 to 5 cis-ethylenic bonds and $R^1$ is an ethylene or ethylene group, are prepared by selectively hydrogenating an acid $R_1CH_2CH=CHCOOH$ where $R_1$ contains from 1 to 5 acetylenic or cis-ethylenic bonds. The resulting polyenoic acids, for instance arachidonic acid, are useful as intermediates, especially in the preparation of prostagladins.

---

This invention relates to a process for preparing ethylenic carboxylic acids and to certain of the acids themselves.

Certain unsaturated fatty acids having skipped double bond systems are of importance as essential fatty acids, which are precursors in prostaglandin biosynthesis. The most important such acids are eicosa-8c,11c,14c-trienoic acid (bishomo-γ-linolenic acid) and eicosa-5c,8c,11c,14c-tetraenoic acid (arachidonic acid), which are the precursors of $PGE_1$ and $PGE_2$ respectively. (The designations c and t are here used to indicate cis and trans configuration.) Other related acids that are precursors in the biosynthesis of prostaglandins having valuable pharmacological properties are heneicosa-8c,11c,14c-trienoic and eicosa-2t,8c-11c,-14c-tetraenoic acids, which are converted by means of prostaglandin synthetase into ω-homo-$PGE_1$ and 2t-dehydro-$PGE_1$ respectively. Considerable research effort has been directed to the synthesis of such unsaturated fatty acids, and methods have been developed which involve multi-stage synthesis. The present invention is concerned with a process for making such phostaglandin precursors and other ethylenic carboxylic acids.

The process of the present invention is directed to the conversion of αβ-ethylenic carboxylic acids having acetylenic or further ethylenic bonds to carboxylic acids having a reduced degree of unsaturation. Not only can the acetylenic bonds in such acids be selectively hydrogenated to ethylenic bonds as would be expected from the behaviour in selective hydrogenation of polyynoic acids, for instance eicosa-5,8,11,14-tetraynoic acid, and polyenynoic acids, for instance octadeca-9c,12c-dien-6-ynoic acid, as described in British Patents 895,897 and 909,354, but it has been discovered that it is possible both to leave the αβ-ethylenic bond untouched while partially hydrogenating the acetylenic bonds, and to saturate the αβ-ethylenic bond while preserving ethylenic bonds elsewhere in the acid molecule. The αβ-ethylenic bond thus has a reactivity towards selective hydrogenation intermediate between, and quite distinct from that of an acetylenic bond and also that of other ethylenic bonds. While the proximity of the carboxylic acid group evidently accounts for the greater reactivity of the αβ-ethylenic bond than that of other ethylenic bonds, it is surprising that such clear-cut selective hydrogenation can be effected to give in good yield products at both intermediate levels of hydrogenation.

A process of this invention is one for preparing an ethylenic carboxylic acid of the structure $$RCH_2-R'-COOH,$$

where R is a monovalent aliphatic hydrocarbon radical containing from 1 to 5 cis-ethylenic bonds, and R' is an ethenylene (CH=CH) or ethylene ($CH_2CH_2$) group, comprising contacting an αβ-ethenoic acid of the structure $R_1CH_2CH=CHCOOH$ where $R_1$ is a monovalent aliphatic hydrocarbon radical containing from 1 to 5 acetylenic or cis-ethylenic bonds in solution in a solvent with hydrogen and a catalyst selective for hydrogenation of acetylenic bonds to ethylenic bonds until the required amount of hydrogen has been absorbed, and recovering the acid product from solution.

Accordingly, the process of the invention can take three distinct forms. In the first, where $R_1$ contains from 1 to 5 acetylenic bonds, hydrogenation is terminated after absorption of the amount of hydrogen required to convert the acetylenic bonds present to ethylenic bonds without saturation of the αβ-ethenylene group. In the second form the starting acid is the same, but hydrogenation is terminated after absorption of the amount of hydrogen required both to convert the acetylenic bonds present to ethylenic bonds and to saturate th αβ-ethenylene group. In the third form, $R_1$ contains from 1 to 5 ethylenic bonds and hydrogenation is terminated after absorption of the amount of hydrogen required to saturate the αβ-ethenylene group. These three forms of the invention all depend upon the fact that the αβ-ethylenic bond is of a reactivity towards catalytic hydrogenation intermediate between that of aceylenic and ethylenic bonds in other positions in the acid molecule.

The group $R_1$ can be a branched chain hydrocarbon radical, but preferably it is a straight chain group. It can be an alkanyl (saturated alkyl), alkenyl, alkadienyl, alkynyl, or alkadiynyl group, but preferably it contains from 3 to 5 acetylenic bonds or from 3 to 5 ethylenic bonds. $R_1$ is preferably a straight chain group of from 3 to 18 carbon atoms, and its acetylenic or ethylenic bonds are preferably in the form of skipped unsaturation, that is, each acetylenic or ethylenic bond is separated from the next adjacent acetylenic or ethylenic bond by one methylene group. Preferably the αβ-ethenylene group is in the trans-confiugation.

The preparation of suitable starting acids is described in British Patent Specification 7774/71, and typical examples of such acids are:

non-2t-en-5-ynoic acid
dodec-2t-en-5-ynoic acid
dodec-2t-en-5,9-diynoic acid
tridec-2t-en-5,10-diynoic acid
tetradec-2t-en-5,8-diynoic acid
heptadec-2t-en-5,8,11-triynoic acid
eicos-2t-en-8,11,14-triynoic acid
eicos-2t-en-5,8,11,14-tetraynoic acid
eicos-2t-en-5,8,11,14-pentaynoic acid
eicos-2t-en-5,8,11,14,17-pentaynoic acid The products of the first form of the process of the invention are starting materials for the third form of the process: typical of these are:

nona-2t-5c-dienoic acid
dodeca-2t,5c-dienoic acid
dodeca-2t-5c,9c-trienoic acid
trideca-2t-5c,10c-trienoic acid
tetradeca-2t,5c-,8c-trienoic acid
heptadeca-2t,5c,8c,11c-tetraenoic acid
eicosa-2t,8c-,11c,14-tetraenoic acid
eicosa-2t,5c,8c,11c,14-pentaenoic acid
eicosa-2t-5c,8c,11c,14c,17c-hexaenoic acid
heneicosa-2t,8c,11c,14c-tetraenoic acid By selective hydrogenation eicos-2t-en-8,11,14-triynoic acid can be converted to eicosa-2t,8c,11c,14c-tetraenoic or to eicosa - 8c,11c,14c-trienoic acids, which are the precursors for 2t-dehydro-PGE$_1$ and PGE$_1$ itself. Eicos-2t-en - 5,8,11,14-tetrayanoic acid and eicosa-2t,5c,8c,11c,14c-pentaenoic acid can both be converted to arachidonic acid, the precursor for PGE$_2$, and eicos - 2t-en-5,8,11,14,17-pentaynoic acid can be converted to eicosa-5c,8c,11c,14c, 17c-pentaenoic acid, the precursor for PGE$_3$. Heneicos-2t-en-8,11,14-triynoic acid can be converted to heneicosa-8c, 11c,14c-trienoic acid, the precursor for ω-homo-PGE$_1$.

While the starting acid will normally be used in the form of the free acid, it will be understood that it can also be used in the form of a derivative, for example an ester with an alcohol, for instance the methyl ester.

As catalyst there is used a catalyst of the type selective for semi-hydrogenation of acetylenic bonds in the presence of ethylenic bonds, preferably a Lindlar catalyst, such as 5% palladium on calcium carbonate catalyst on which a small amount of lead has been deposited, and where hydrogenation is effected in the presence of a small amount of quinoline. The selective hydrogenation is effected by dissolving the starting acid in a suitable solvent, for instance light petroleum, acetone, ethyl acetate or tetrahydrofuran, and the solution shaken, for instance at atmospheric pressure and ambient temperature, with hydrogen and a suitable amount of catalyst, until the amount of hydrogen required for the conversion has been taken up, after which hydrogenation is discontinued, the catalyst filtered off and the product isolated by removal of solvent. The product can be purified from traces of other acids by column chromatography on silica if desired.

A process of the invention is preferably one preceded by a condensation process for preparing the $\alpha\beta$-ethenoic acid described in British Patent Specification 7,774/71.

The new carboxylic acids of the invention are those of the structure

in which R″ is an alkanyl, alkenyl, alkadienyl or alkatrienyl group having from 1 to 16, and preferably from 12 to 15, carbon atoms. R″ is preferably a straight chain group. Typical acids of the invention are:

nona-2t,5c-dienoic acid
dodeca-2t,5c-dienoic acid
dodeca-2t,5c,9c-trienoic acid
trideca-2t,5c,10c-trienoic acid
tetradeca-2t,5c,8c-trienoic acid
heptadeca-2t,5c,8c,11c-tetraenoic acid
eicosa-2t,5c,8c,11c,14c-pentaenoic acid
eicosa-2t,5c,8c,11c,14c,17c-hexanenoic acid These acids are useful as intermediates for conversion to other acids, for instance as described above. The acids can, of course, be converted to saturated fatty acids by further hydrogenation. Acids of the structure $$CH_3(CH_2)_n(CH=CHCH_2)_pCH=CHCOOH$$

where $n$ and $p$ are single numerals, $n$ is from 0 to 5, and $p$ is from 3 to 5, with the provisos that $n+3p$ is from 14 to 18, and when $p$ is 3, $n$ is from 3 to 5, are useful either as substrates for conversion to prostaglandins by biosynthesis using prostaglandin synthetase, or by selective hydrogenation by a process of this invention in which the $\alpha\beta$-ethylenic bond is saturated to give such substrates, which can be converted to prostaglandins as described in British Patent 1,115,641.

The invention is illustrated by the following Examples, in which temperatures are ° C. and GLC refers to gas-liquid chromatography.

EXAMPLE 1

Non-2t-en-5-ynoic acid (301 mg., 1.98 mmol) dissolved in ethyl acetate (20 ml.) was shaken with hydrogen at atmospheric pressure in the presence of Lindlar catalyst (500 mg., prepared as in Organic Syntheses, 1966, 46, 89) poisoned with quinoline (0.1 ml.). Hydrogenation was discontinued when 46.3 ml. hydrogen (calculated 46.6 ml. required for semi-hydrogenation of the acetylenic bond only) had been absorbed, the mixture was then filtered through a small sodium sulphate column and evaporated to dryness under reduced pressure. The residue was dissolved in ether and the quinoline present removed by repeated extraction with 1% aqueous sodium bisulphate solution, after which the ether solution was washed with saturated aqueous sodium chloride solution, dried over anhydrous magnesium sulphate and evaporated under reduced pressure to give nona-2t,5c-dienoic acid as an oil. A sample of this oil was converted to the methyl ester of the acid by reaction with diazomethane, and by means of GLC of this ester it was shown that the purity of the acid product was 94%. The acid could be further purified by column chromatography on silica using an eluant mixtures of light petroleum and ether.

EXAMPLE 2

Using the procedure of Example 1, dodec-2t-en-5-ynoic acid (790 mg., 4.1 mmol) in ethyl acetate (20 ml.) was hydrogenated until 104 ml. hydrogen was absorbed (calculated 100.1 ml. required for semi-hydrogenation of the acetylenic bond only) and the product isolated. Dodeca-2t,5c,dienoic acid (800 mg.) was obtained as a colourless oil, a sample of which was converted to its methyl ester by means of diazomethane and the acid product thus shown by GLC to be 93% pure. The acid was further purified by column chromatography on silica using a mixture of light petroleum and eter in proportions 90 to 10 by volume as eluant, and by this means an acid of 96.5% purity was obtained. The methyl ester from this acid showed a mass spectrum having a parent peak at m/e 210 (calculated 210). The free acid deteriorated even when stored at 0° under purified nitrogen. A sample of the acid (18 mg.) dissolved in methanol (6 ml.) was completely hydrogenated using Adams catalyst (32 mg.), when the hydrogen uptake was 4.6 ml. (calculated 4.4 ml.); after removal of catalyst the solution was evaporated to dryness to give lauric acid (17 mg.), mg.), m.p. 39–42° C.

EXAMPLE 3

Dodec-2t-en-5,9-diynoic acid (403 mg., 2.12 mmol) dissolved in ethyl acetate (20 ml.) was selectively hydrogenated until 106.5 ml. hydrogen was taken up (calculated 103.7 required for semi-hydrogenation of the two acetylenic bonds alone) and the product isolated, using the procedure of Example 1. Dodeca-2t,5c,9c-trienoic acid (411 mg.) was isolated as an oil of purity 85% as determined by conversion to its methyl ester using diazomethane and GLC of this ester. Purification by column chromatography on silica using mixtures of light petroleum and ether of increasing polarity yield a fraction of 95% purity.

EXAMPLE 4

By the procedure of Example 1, tridec-2t-en-5,10-diynoic acid (103 mg., 0.5 mmol) was selectively hydrogenated with uptake of 22.9 ml. hydrogen (calculated 23.0 ml. required for semi-hydrogenation of the two acetylenic bonds only) to give trideca-2t,5c,10c-trienoic acid as an oil which conversion to the methyl ester by means of diazomethane followed by GLC showed was of 94% purity.

EXAMPLE 5

Tetradec-2t-en-5,8-diynoic acid (109 mg., 0.5 mmol) in ethyl acetate (15 ml.) was selectively hydrogenated using Lindlar catalyst (100 mg.) poisoned with quinoline (0.2 ml.) until 26.4 ml. hydrogen was absorbed (calculated 24.4 ml. required for semi-hydrogenation of the acetylenic bonds only): filtration of catalyst and isolation of the acid product gave tetradeca-2t,5c,8c-trienoic acid (107 mg.), a sample of which was converted to its methyl ester by means of diazomethane: GLC showed that 81.2% of a compound identified by infra red (IR) and nuclear magnetic resonance (NMR) spectra as having the assigned structure was present.

EXAMPLE 6

The hydrogenation of Example 5 was carried out except that hydrogenation was continued until 37.0 ml. hydrogen was taken up (calculated 36.5 ml. required for semi-hydrogenation of the acetylenic bonds and saturation of the $\alpha\beta$-ethylenic bond): filtration of catalyst and isolation of the acid product gave tetradeca-5c,8c-dienoic acid (102 mg.), a sample of which was converted to its methyl ester by means of diazomethane: GLC showed that 81% of a compound identified by IR and NMR spectra as having the assigned structure was present.

EXAMPLE 7

A suspension of Lindlar catalyst (250 mg.) and quinoline (0.05 ml.) in ethyl acetate (5 ml.) was shaken with hydrogen until no more hydrogen was absorbed. A solution of eicosa-2t-en-5,8,11,14-tetraynoic acid (60.6 mg., 0.21 mmol) in ethyl acetate (5 ml.) was added and hydrogenation effected at atmospheric pressure: when 25.2 ml. hydrogen had been absorbed (calculated 25.0 ml. for semi-hydrogenation of the acetylenic bonds and saturation of the $\alpha\beta$-ethylenic bond), hyodrgenation was discontinued, the reaction mixture filtered through anhydrous sodium sulphate and evaporated to dryness. The residue was dissolved in ether, the solution extracted with 2% aqueous sodium bisulphate solution, washed with saturated salt solution and dried over anhydrous magnesium sulphate, to give arachidonic acid (61.1 mg.). NMR analysis of the product showed that it had the required absorption, though the intensities were distorted by some impurities.

| Absorption | Intensity | Assignment |
|---|---|---|
| 5.15–5.49 Complex | 8 | H  H<br>—C=C— |
| 2.60–2.87 Complex | 6 | H  H     H  H<br>—C=C—CH$_2$C=C |
| 2.31 Triplet | 2 | —CH$_2$—COOH |
| 1.87–2.21 Complex | 4 | H  H<br>—C=C—CH$_2$—CH$_2$ |
| 1.69 Quintet | 2 | —CH$_2$—CH$_2$—COOH |
| 1.15–1.47 Complex | 6 | —(CH$_2$)$_3$— |
| 0.84 Distorted triplet | 3 | CH$_3$— |

EXAMPLE 8

A suspension of Lindlar catalyst (600 mg.) and quinoline (1.2 ml.) in ethyl acetate (10 ml.) was shaken with hydrogen until no more hydrogen was taken up: methyl eicos-2t-en-5,8,11,14-tetraynoate (340 mg., 1.1 mmol) in ethyl acetate (10 ml.) was added and hydrogenation was carried on for 7 minutes at ambient temperature and atmospheric pressure, by which 105.5 ml. hydrogen had been taken up (calculated 105.5 ml. for semi-hydrogenation of the acetylenic bonds): isolation of the product by filtration, addition of ether, washing with 2% aqueous sodium bisulphate solution followed by saturated ammonium chloride solution, drying and evaporation gave methyl eicosa-2t,5c,8c,11c,14c-pentaenoate (350 mg.), of 71% purity as shown by GLC.

What is claimed is:

1. A process for preparing an ethylenic carboxylic acid of the structure RCH$_2$—R'—COOH, where R is a monovalent aliphatic hydrocarbon radical of from 3 to 18 carbon atoms containing from 1 to 5 cis-ethylenic bonds and R' is an ethenylene or ethylene group, comprising contacting an $\alpha\beta$-ethenoic acid of the structure R$_1$CH$_2$CH=CHCOOH where R$_1$ is a monovalent aliphatic hydrocarbon radical containing from 1 to 5 acetylenic or cis-ethylenic bonds in solution in a solvent with hydrogen and a catalyst of the type selective for semi-hydrogenation of acetylenic bonds in the presence of ethylenic bonds until the required amount of hydrogen has been absorbed, and recovering the acid product from solution.

2. A process according to Claim 1, where R$_1$ contains from 1 to 4 acetylenic bonds, and hydrogenation is terminated after absorption of the amount of hydrogen required to convert the acetylenic bonds present to ethylenic bonds without saturation of the $\alpha\beta$-ethenylene group.

3. A process according to Claim 1, where R$_1$ contains from 1 to 4 acetylenic bonds, and hydrogenation is terminated after absorption of the amount of hydrogen required to convert the acetylenic bonds present to and to saturate the $\alpha\beta$-ethenylene group.

4. A process according to Claim 1, where R$_1$ contains from 1 to 4 ethylenic bonds, and hydrogenation is terminated after absorption of the amount of hydrogen required to saturate the $\alpha\beta$-ethylene group.

5. A process according to Claim 2, in which the starting acid is eicos-2t-en-5,8,11,14-tetraynoic acid.

6. A process according to Claim 3, in which the starting acid is eicos-2t-en-5,8,11,14-tetraynoic acid.

7. A process according to Claim 1 in which hydrogenation is effected using Lindlar catalyst.

8. An acid having the structure

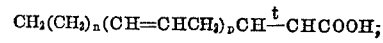

where $n$ and $p$ are single numerals, $n$ is from 0 to 5 and $p$ is from 3 to 5, with the provisos that $n+3p$ is from 14 to 18, and when $p$ is 3, $n$ is from 3 to 5.

9. Eicosa-2t,5c,8c,11c,14c-pentaenoic acid.

References Cited

UNITED STATES PATENTS

| 3,412,114 | 11/1968 | Fernholz et al. | 260—526 NX |
| 3,031,512 | 4/1962 | Osbond | 260—413 |
| 2,783,258 | 2/1957 | Celmer | 260—413 |

FOREIGN PATENTS

| 909,354 | 10/1962 | Great Britain | 260—413 |
| 179,761 | 11/1966 | Russia | 260—413 |

OTHER REFERENCES

Verdino et al., Chem. Abs. 61:8686b.

Christophe et al, Journ. Lipid Research, July 1961, (pages 251 and 252 pert.) vol. 2, No. 33, pp. 244–57.

LEWIS GOTTS, Primary Examiner

E. G. LOVE, Assistant Examiner

U.S. Cl. X.R.

260—410.9 R, 413, 526 N